United States Patent

[11] 3,594,520

| [72] | Inventors | James R. Hall<br>Canoga Park;<br>Peter B. Korda, Los Angeles, both of, Calif. |
|---|---|---|
| [21] | Appl. No. | 870,840 |
| [22] | Filed | Oct. 22, 1969 |
| [23] | | Division of Ser. No. 682,121 Nov. 13, 1967 |
| [45] | Patented | July 20, 1971 |
| [73] | Assignee | RCA Corporation |

[54] AGITATION SWITCH
8 Claims, 5 Drawing Figs.

[52] U.S. Cl. .................................................... 200/61.45,
200/61.93
[51] Int. Cl. ...................................................... H01h 35/14
[50] Field of Search ......................................... 200/61.45,
61.77, 61.93; 338/43, 208, 99, 101; 59/73, 93;
340/276

[56] References Cited
UNITED STATES PATENTS

| 362,859 | 5/1887 | Stearns.......................... | 338/99 |
| 450,734 | 4/1891 | Bunker.......................... | 174/119 |
| 3,340,370 | 9/1967 | Sideleau........................ | 200/44 |

FOREIGN PATENTS

| 167,387 | 12/1950 | Austria.......................... | 174/69 |

*Primary Examiner*—Robert K. Schaefer
*Assistant Examiner*—M. Ginsburg
*Attorney*—Edward J. Norton

ABSTRACT: Disclosed is a switch element, primarily for use within a detection system. The switch is formed of electrically conductive links intercoupled in a loose chain and exhibits a through impedance, as measured across its terminals, which changes significantly when it is agitated from a state of quiescence.

PATENTED JUL20 1971  3,594,520

Inventors:
JAMES R. HALL &
PETER B. KORDA
By Herbert L. Jacobson
Attorney 3,594,520

AGITATION SWITCH

This is a division of application, Ser. No. 682,121, filed Nov. 13, 1967.

BACKGROUND OF THE INVENTION

This invention relates to switch devices in general and, more particularly, to a switch device for use in an intruder-detection system.

There are many diverse types of systems in existence today, the function of which is to detect the presence of a predetermined condition and activate an alarm in response thereto. These systems generally include a sensing element coupled in some manner to an alarm device, the operation of the latter being contingent upon the condition of the former. The sensing device may operate in any of a number of ways. For example, it may be temperature sensitive as in the case of a thermostat, or light sensitive as in the case of a photocell. Systems which are used to detect the presence of an intruder, such as burglar or theft alarm systems, often utilize an electromechanical type sensing element to activate the alarm. These elements generally operate on a make-break concept wherein physical contact by an intruder with the element causes it to either open or close an electrical circuit, whichever the desired case may be. Though several such electromechanical systems are well known in the art, too often they incorporate many disadvantages; e.g., the sensing elements may be relatively large in size and not sufficiently sensitive to physical contact, they may be difficult to position or set up, or they may be relatively easy to detect and circumvent.

SUMMARY OF THE INVENTION

This invention relates to a novel switch element, sensitive to agitation, which may be incorporated into a detection system for indicating the presence of an intruder, or other like systems.

Basically, the switch element consists of a plurality of electrically conductive links which are intercoupled to form a loose chain. The resulting chainlike assembly, when randomly placed into a quiescent state, exhibits a relatively high through impedance. Should the switch be agitated, e.g., as a result of coming in contact with a foreign substance, the through impedance of the assembly will decrease to a relatively low value.

Accordingly, it is an object of the present invention to provide an electromechanical switch which is sensitive to agitation and insensitive to position.

Another object is to provide such a switch which is relatively small in size, mass producible, and inexpensive.

DESCRIPTION OF THE FIGURES

The foregoing objects, along with additional objects and applications, will become more readily evident to those skilled in the art after reading the specification which follows in conjunction with the accompanying drawings wherein:

FIG. 1 represents the basic configuration of the disclosed invention. As shown it consists of a plurality of electrically conductive links 10 which are intercoupled to form a loose chain 12. Experimentation has shown that the underlying theory which describes the operation of the switch is equally applicable regardless of the physical size of the links 10 used. As a practical matter, however, it has been found that relatively small links 10, such as are incorporated in neck chains, are best suited for constructing a sensing device for use in an intruder-detection alarm system, and further discussion within this application will be so oriented.

Figure 1:
FIGS. 1 through 4 represent alternative configurations which the agitation switch may assume.

As previously described, a chainlike switch 12, as shown in FIG. 1, exhibits a variable impedance as measured across its length, the range of which has limits effectively corresponding to an open circuit at one extreme and a closed circuit at the other. The significant characteristic which such a structure displays, and which makes it particularly advantageous for use in an intrusion-detection system, is that it exhibits a high through impedance when in a state of quiescence without its having been particularly positioned to do so. That is, if the switch 12 is arbitrarily permitted to come to a random state of rest, and the impedance across its outer links 14 measured, it will be found to be relatively high. In the case of a switch composed of four links 10 the impedance has been found to be in excess of 20 megohms when the switch 12 is randomly placed at rest. This characteristic can be explained as a result of the relatively high probability against each of the links 10 making perfect electrical contact with those links disposed adjacent to it when randomly placed into a state of quiescence. The cascaded effect of the poor electrical contact between individual links 10 results in the relatively high impedance of the overall assembly.

When the assembly is momentarily disturbed from its position of rest, the individual links 10 are brought into effective electrical contact with each other and the overall impedance of the assembly is substantially reduced. Measurements taken during periods of agitation revealed that the impedance of the assembly dropped to values of less than 10 ohms for periods ranging from 30 microseconds to 4 milliseconds.

Figure 5:
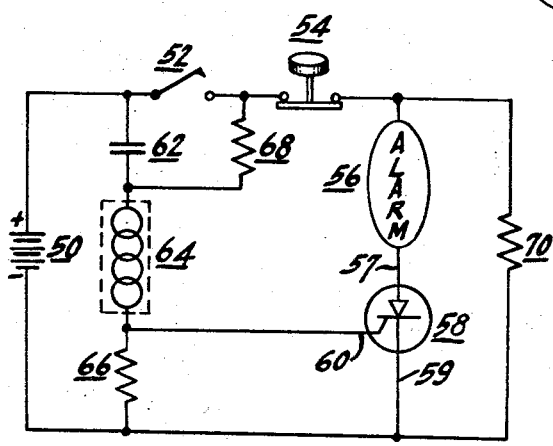
FIG. 5 represents a circuit diagram of an alarm system showing how the agitation switch may be incorporated into such a system.

A switch exhibiting the above-described characteristics offers significant benefits when incorporated into an electrical circuit. In the case of an alarm system the switch may normally operate to effectively open a circuit when it is in a state of rest. Should the switch be disturbed by an intruder it will effectively operate as a closed circuit to permit the completion of the alarm circuit and result in the activation of the alarm device. FIG. 5 is a circuit diagram of an alarm system into which such a switch may be readily incorporated.

In the alarm system represented by FIG. 5 the positive terminal of a battery 50 is connected to one side of a mechanical switch 52 having an open position and a closed position. The second side of the mechanical switch 52 is connected to one side of a normally closed reset switch 54. The second side of the reset switch is connected to one side of an alarm device 56. The second side of the alarm device 56 is connected to the anode 57 of a silicon-controlled rectifier (SCR) 58. The cathode 59 of the SCR 58 is connected to the negative terminal of battery 50 to complete a circuit. A capacitor 62 is connected in series with an agitation switch 64 and a resistor 66, in the order named; the capacitive side of the series combination connected to the positive terminal of the battery 50, and the resistive side of the series combination connected to the negative terminal; the agitation switch 64 being of the type previously described. A resistor 68 is connected on one side to the junction formed by the mechanical switch 52 and the reset switch 54; and on its other side to the junction formed by the capacitor 62 and the agitation switch 64. The gate electrode 60 of the SCR 58 is connected to the junction formed by the agitation switch 64 and the resistor 66. A resistor 70 is connected on one side to the junction formed by the reset switch 54 and the alarm device 56; and on the other side to the cathode 59 of SCR 58.

Turning now to a brief description of the operation of the circuit depicted in FIG. 5, when switch 52 is in its off position, capacitor 62 is charged through resistor 68, the normally closed reset switch 54, and resistor 70; the agitation switch 64 normally exhibiting a relatively high through impedance, corresponding to an open circuit, when in a state of rest. To operate the system, switch 52 is closed thereby causing capacitor 62 to discharge through the switch 52 and resistor 68. Thereafter, should switch 64 be agitated even momentarily, its impedance will decrease to effectively present a closed circuit, which will result in capacitor 62 charging through resistor 66 and the gate electrode 60 of SCR 58 via the agitation switch 64. This will operate to apply a triggering signal to the gate 60 of the SCR 58 and, since the SCR 58 is already forward biased by the battery 50, will cause the SCR to be switched into a conducting state whereby the alarm device 56 will be connected to the battery 50 and activated. If the alarm 56 is continuous in operation it may be discontinued by utilizing the reset switch 54, the opening of which will cause the SCR to discontinue operation pending the application of a subsequent triggering signal.

Figure 2:
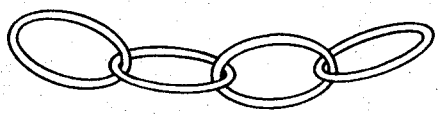

While the above described embodiment utilizes the characteristics of the agitation switch to activate an alarm when the switch is closed, it will be readily evident that applications of the switch need not be so limited. For example, FIG. 2 shows an agitation switch suspended by its terminal links, such that gravitational forces tend to cause the switch to exhibit a relatively low through impedance; i.e., the links are normally brought into good electrical contact effectively resulting in a closed circuit. In such a case the through impedance of the switch is normally low and will, upon agitation, effectively operate to result in an opened circuit. Various circuits may be developed to utilize the foregoing characteristics of the described agitation switch. For example, circuits may be designed having delayed firing characteristics wherein the alarm device will not be activated upon the initial closing of the agitation switch but only upon subsequent closings.

Figure 3:
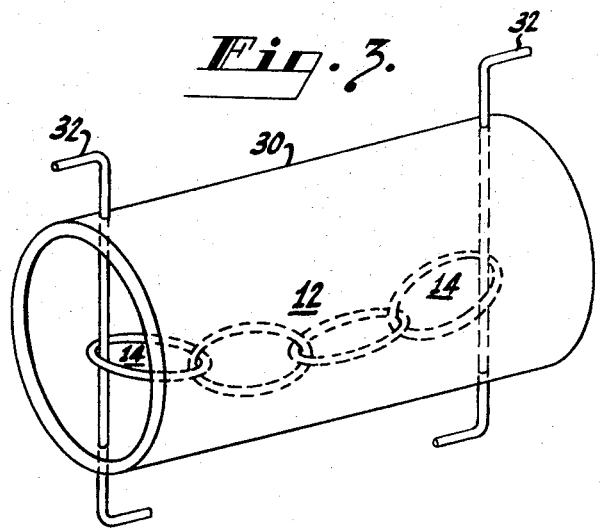
Figure 4:
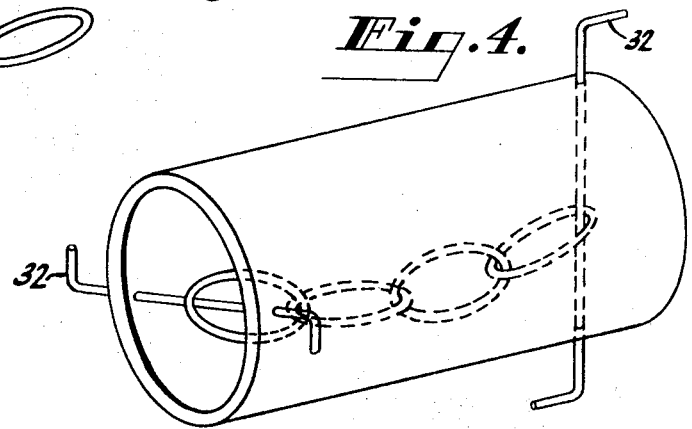

FIG. 3 depicts an agitation switch as previously described which has been enclosed within a sleevelike housing 30. The enclosure 30 serves to protect the switch 12 from external forces which might tend to impair its operation. Furthermore, the sleeve 30 may in a proper case prevent gravitational closures of the switch should the same not be desired. The housing may be made of a plastic or other nonconductive material and may be opened at its extremities or totally enclosed. External connections are made to the switch via connecting terminals 32 which are secured through the housing 30 and extend therefrom. Internally, the connecting terminals pass through the end links 14 of the switch 12 and are disposed to loosely secure them in position without affecting the physical and/or electrical characteristics of the switch previously described. The switch shown in FIG. 4 is similar in structure to that of FIG. 3 except that in the case of the latter the connecting terminals 32 are arranged in nonparallel relationship with respect to each other. This has been found to effectuate a greater sensitivity of switch operation and to make the characteristics of the switch even more independent of its physical orientation.

What I claim is:
1. An agitation sensitive switch comprising:
a plurality of intercoupled conductive links,
said links exhibiting a first through impedance when positioned in any of a number of possible positions and a second through impedance when momentarily disturbed from said positions,
one of said through impedances corresponding to a relatively high impedance, and the other of said through impedances corresponding to a relatively low impedance, and
means loosely connecting the terminal links of said intercoupled links to linearly extending portions of a pair of terminals of an electrical circuit, for completing said circuit.

2. An agitation sensitive switch for effectively completing an electrical circuit, said switch comprising:
a plurality of intercoupled conductive links, said links exhibiting a relatively high through impedance during periods of quiescence and a relatively low through impedance during momentary periods of agitation, and
means loosely connecting the terminal links of said plurality of links to linearly extending portions of a pair of terminals of said electrical circuit, for completing said circuit,
said plurality of links effectively operating as an open switch during periods of quiescence and as a closed switch when agitated.

3. An agitation sensitive switch as defined in claim 2, said relatively high through impedance being in excess of 20 megohms,
said relatively low through impedance being less than 10 ohms.

4. An agitation sensitive switch as defined in claim 2, said switch further comprising:
a hollow sleeve which houses said plurality of links.

5. An agitation sensitive switch as defined in claim 4 wherein
said pair of terminals comprises pinlike elements, said elements being affixed to said hollow sleeve and passing therethrough in orthogonal relationship with the longitudinal axis thereof,
said elements being disposed to pass through the terminal links of said intercoupled plurality of links housed within said hollow sleeve.

6. An agitation sensitive switch as defined in claim 5,
said pinlike elements being disposed in nonparallel relationship with respect to each other.

7. An agitation sensitive switch for effectively completing an electrical circuit, said switch comprising:
a plurality of intercoupled conductive links, said links normally exhibiting a relatively low through impedance when suspended in free space, and a relatively high through impedance when momentarily disturbed from said state of suspension, and
means loosely connecting the terminal links of said plurality of links to linearly extending portions of a pair of terminals of an electrical circuit, for completing said circuit,
said plurality of links effectively operating as a closed switch during periods of suspension and as an open switch when disturbed from said position of suspension.

8. An agitation sensitive switch as defined in claim 7, said relatively low through impedance being less than 10 ohms,
said relatively high through impedance being in excess of 20 megohms.